United States Patent
Yadav

(10) Patent No.: US 9,838,317 B1
(45) Date of Patent: Dec. 5, 2017

(54) POLICY-BASED SELECTIVE TRAFFIC REROUTE BASED ON PREDICTED TRAFFIC LOSS

(71) Applicant: Juniper Networks, Inc., Sunnyvale, CA (US)

(72) Inventor: Alam Yadav, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 189 days.

(21) Appl. No.: 14/683,217

(22) Filed: Apr. 10, 2015

(51) Int. Cl.
*H04L 12/801* (2013.01)
*H04L 12/721* (2013.01)
*H04L 12/813* (2013.01)
*H04L 12/26* (2006.01)

(52) U.S. Cl.
CPC ........ *H04L 47/127* (2013.01); *H04L 43/0829* (2013.01); *H04L 45/70* (2013.01); *H04L 47/20* (2013.01)

(58) Field of Classification Search
CPC ... H04L 47/127; H04L 43/0829; H04L 47/20; H04L 45/70
See application file for complete search history.

(56) References Cited

U.S. PATENT DOCUMENTS

| 7,975,175 B2 * | 7/2011 | Votta | G06F 11/004 714/13 |
| 2006/0209719 A1 * | 9/2006 | Previdi | H04L 12/4633 370/254 |
| 2013/0010610 A1 * | 1/2013 | Karthikeyan | H04L 12/2423 370/242 |
| 2013/0275589 A1 * | 10/2013 | Karthikeyan | H04L 41/142 709/224 |
| 2015/0195192 A1 * | 7/2015 | Vasseur | G06F 11/2007 714/47.3 |
| 2015/0333953 A1 * | 11/2015 | Vasseur | H04L 41/0668 370/228 |
| 2015/0372901 A1 * | 12/2015 | Pacella | H04L 45/28 370/225 |

(Continued)

OTHER PUBLICATIONS

Satz, "Connectionless Network Protocol and End System to Intermediate System Management Information Base," ISO 8473, Network Working Group, Jun. 1990, 77 pp.

(Continued)

*Primary Examiner* — Christopher Grey
(74) *Attorney, Agent, or Firm* — Shumaker & Sieffert, P.A.

(57) ABSTRACT

An example network device includes a set of physical network interfaces and a control unit that executes a routing protocol and a traffic impact prediction module. The traffic impact prediction module determines, prior to occurrence of a topology-changing device fault, that one or more operating characteristics of the network device are indicative of a possible fault, wherein the network device is one of a plurality of network devices in a network, determines a probability of traffic loss associated with the possible fault, and determines an adjusted routing metric for routes impacted by the possible fault based at least in part on the probability of the traffic loss. The routing protocol sends, via at least one of the set of physical network interfaces, one or more interior gateway protocol update messages specifying the adjusted routing metric to at least one other network device in the network.

20 Claims, 3 Drawing Sheets

(56) References Cited

U.S. PATENT DOCUMENTS

2016/0218963 A1* 7/2016 Nauck ................... H04L 45/70

OTHER PUBLICATIONS

Clausen et al, "The Optimized Link State Routing Protocol Version 2," RFC 7181, Internet Engineering Task Force, Apr. 2014, 115 pp.

"Information technology—Telecommunications and information exchange between systems—Intermediate System to Intermediate System intra-domain routeing information exchange protocol for use in conjunction with the protocol for providing the connectionless-mode network service," International Standard, ISO/IEC 10589, Second edition Nov. 15, 2002, 210 pp.

"OAM functions and mechanisms for Ethernet based networks," International Telecommunication Union, Y.1731, May 2006, 80 pp.

Zimmermann, "OSI Reference Model—The ISO Model of Architecture for Open Systems Interconnection," IEEE Transactions on Communications, vol. Com 28, No. 4, Apr. 1980, 8 pp.

\* cited by examiner

POLICY-BASED SELECTIVE TRAFFIC REROUTE BASED ON PREDICTED TRAFFIC LOSS

TECHNICAL FIELD

This disclosure relates to computer networks and particularly to routing of network packets in computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols use flooding-based distribution mechanisms to announce topology information to routers within the network. These routing protocols typically rely on routing algorithms that require each of the routers to have synchronized routing topology information. For example, Open Shortest Path First (OSPF) and Intermediate system to intermediate system (IS-IS) routing protocols are link state protocols that use link state messages to ensure their routing topology is synchronized with respect to available interfaces, metrics and other variables associated with network links. For example, OSPF utilizes Link State Advertisements (LSAs) while IS-IS uses Link State protocol data units (LSPs) to exchange information. A router generating a link state message typically floods the link state message throughout the network such that every other router receives the link state message. In network topologies where routers are connected by point-to-point connections, each router floods link state messages to adjacent routers reachable on each interface to ensure synchronization. In networks using multi-access media, such as an Ethernet network, the routers within the network flood the link state messages to all other routers. In either case, the receiving routers construct and maintain their own network topologies using the link information received via the link state messages. IS-IS is specified in "Intermediate system to Intermediate system routing information exchange protocol for use in conjunction with the Protocol for providing the Connectionless-mode Network Service (ISO 8473)", ISO, ISO/IEC 10589:2002, the entire contents of which is incorporated herein by reference.

SUMMARY

In general, this disclosure describes techniques for proactively adjusting metrics of an interior gateway protocol (IGP), to reroute network traffic, based on an operating state of a router, before an occurrence of a topology-changing device fault, which may minimize the impact of the device fault, should it occur. As one example, the techniques described herein may be applied by network devices, such as routers, to proactively change routing information to reroute traffic prior to an occurrence of a topology-changing device fault, such as degradation or failure of a switch fabric, failure of one or more packet forwarding engines, failure of one or more power supplies, failure of one or more network interface cards, etc. The techniques include dynamically adjusting metrics based, at least in part, on one or more operating characteristics of the network device, even though there is not yet any loss of network connectivity. The routing metrics may be updated based on various factors, including processor utilization, temperature (temperature of any element, temperature of the environment within a chassis of the network device, temperature external to the network device, etc.), state of the power of the network device, state of the internal switch fabric, state of the control plane, network traffic congestion, etc. The network device may further adjust the routing metrics based on a determined probability, duration, scope, and severity of traffic loss associated with the possible device fault.

The techniques described in this disclosure may be utilized by an Internet Service Provider (ISP) to increase the reliability of the network service provided to customers. Network devices may, for example, apply policies that route packets through other alternate network devices that are currently operating in a preferred state. In another example, the techniques described in this disclosure may be utilized by an enterprise to reduce or minimize downtime associated with failed network devices by proactively responding to potentially unstable network device conditions prior to failure of the network device. The techniques may also permit an administrator to take preventative measures to correct the potentially problematic network device conditions before occurrence of a device fault. Moreover, by preemptively re-routing network traffic, the network device may be able to attempt automated local recovery actions without comprising the network availability and may be configured with lower thresholds for initiating these automatic recovery actions as there is less likely to be any end user visible impact of these recovery actions.

In one example, a method includes prior to occurrence of a topology-changing device fault, determining, by a router, that one or more operating characteristics of the router are indicative of a possible fault, wherein the router is one of a plurality of routers in a network, and determining, by the router, a probability of traffic loss associated with the possible fault. The method also includes determining, by the router, an adjusted routing metric for routes impacted by the possible fault based at least in part on the probability of the traffic loss, and sending, by the router and to at least one other router of the plurality of routers in the network, one or more interior gateway protocol update messages specifying the adjusted routing metric.

In another example, a network device includes a set of physical network interfaces and a control unit that executes a routing protocol and a traffic impact prediction module. The traffic impact prediction module determines, prior to occurrence of a topology-changing device fault, that one or more operating characteristics of the network device are indicative of a possible fault, wherein the network device is one of a plurality of network devices in a network, determines a probability of traffic loss associated with the possible fault, and determines an adjusted routing metric for routes impacted by the possible fault based at least in part on the probability of the traffic loss. The routing protocol sends, via at least one of the set of physical network interfaces, one or more interior gateway protocol update messages specifying the adjusted routing metric to at least one other network device in the network.

In another example, a non-transitory computer-readable storage medium encoded with instructions that cause one or more processors of a network device to, prior to occurrence of a topology-changing device fault, determine that one or more operating characteristics of the router are indicative of a possible fault, wherein the router is one of a plurality of routers in a network, and determine a probability of traffic loss associated with the possible fault. The instructions further cause the one or more programmable processors to determine an adjusted routing metric for routes impacted by the possible fault based at least in part on the probability of the traffic loss, and send, to at least one other router of the plurality of routers in the network, one or more interior gateway protocol update messages specifying the adjusted routing metric.

The details of one or more embodiments of the techniques of this disclosure are set forth in the accompanying drawings and the description below. Other features, objects, and advantages will be apparent from the description and drawings, and from the claims.

DETAILED DESCRIPTION

Figure 1:
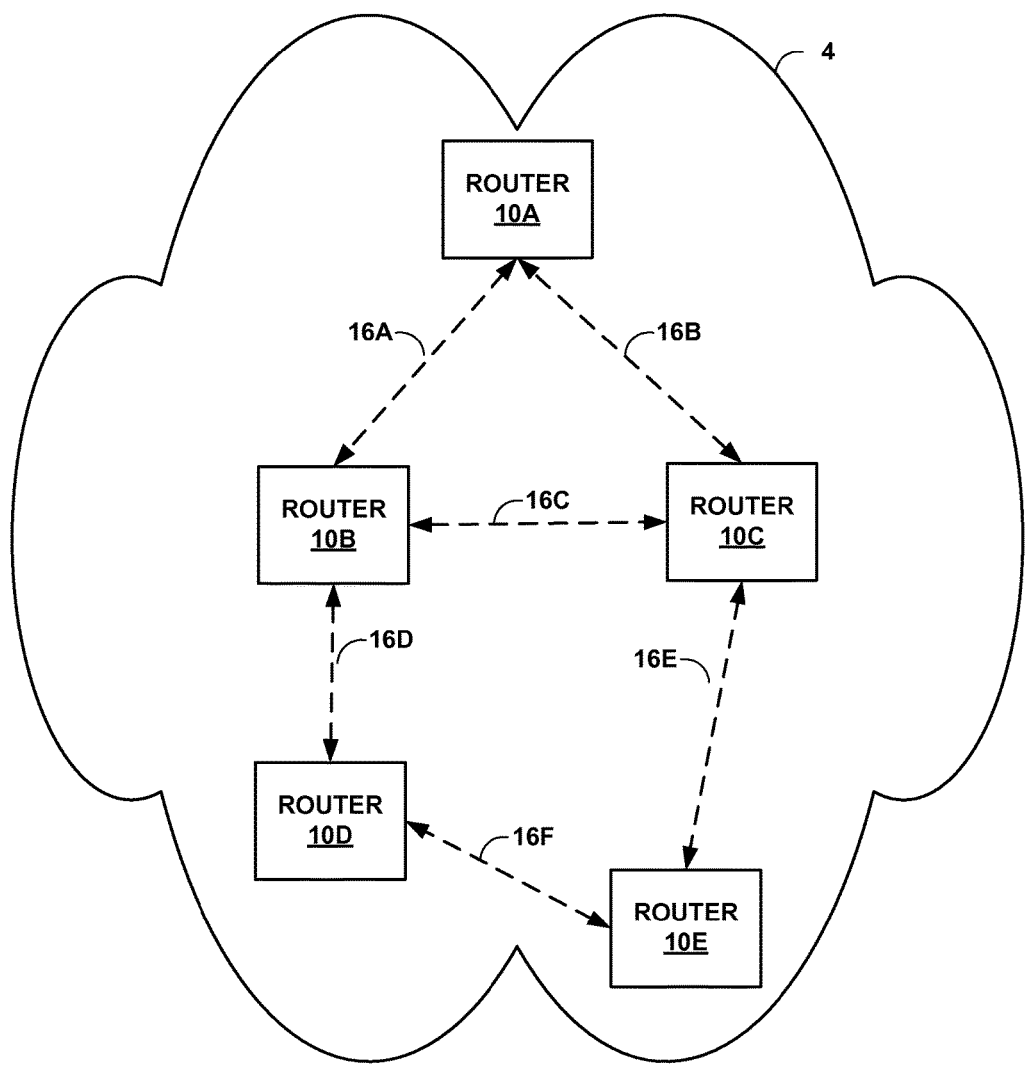
FIG. 1 is a block diagram illustrating an example network system in which routers proactively adjust routing metrics, in accordance with techniques of this disclosure.

FIG. 1 is a block diagram illustrating an exemplary network 4 in which routers proactively adjust routing metrics, in accordance with techniques of this disclosure. In the example of FIG. 1, network 4 is a data communications network that includes a plurality of devices operated by one or more administrators. These administrators may be telecommunications companies, electricity companies, Internet service providers ("ISPs"), public or private enterprises, government entities, educational institutions, non-governmental organizations, individual people, or other persons or organizations that operate network devices. FIG. 1 is shown for purposes of example, and the techniques may readily be extended to network environments in which numerous networks are coupled so as to collectively span significant geographic regions. For example, the techniques described in this disclosure may readily be applied to the Internet, which is a collection of interconnected networks that provide global access to the World Wide Web and a wide variety of other services.

As illustrated in the example of FIG. 1, network 4 may be a public network, e.g., the Internet, or any other packet-based, publicly accessible or private network. Network 4 may support the transmission of data via discrete data units, often referred to as "packets." As a result, network 4 may be referred to as a "packet-based" or "packet switched" network. While described in this disclosure as transmitting, conveying, or otherwise supporting packets, network 4 may transmit data according to any other discrete data unit defined by any other protocol, such as a frame defined by the Ethernet protocol, a cell defined by the Asynchronous Transfer Mode (ATM) protocol, or a datagram defined by the User Datagram Protocol (UDP).

Network 4 includes routers 10A-10E (collectively, "routers 10") that send and receive network packets. Each of routers 10 may comprise routers or another type of route selection device that performs other functions in addition to the routing techniques described in this disclosure. For example, each of routers 10 may also perform bridging functions, switching functions, firewall functions, intrusion detection functions, virtual private networking functions, or other network functions. Routers 10 may be customer edge routers, service provider edge routers, core routers, or any other type of device that provides routing functionality, such as layer three (L3) routing functionality or layers two (L2) switching in accordance with the OSI network model. For example, network 4 may use "multi-access media" in which all L2 communications for the network are sent to (i.e., broadcasted to) all routers 10 coupled to the network. One example of a broadcast network is an Ethernet network, for example, in which an Ethernet frame is communicated to all nodes of the network. As another example, network 4 may use point-to-point L2 communication media, such as optical links. In this example, routing protocol update messages are sent between adjacent routers and are processed and terminated by those routers. Although not shown in FIG. 1, network 4 may include other network devices, such as switches and hubs. Further, although not shown in FIG. 1, each of routers 10 typically services a variety of end-user computing devices, such as laptop computers, desktop computers, workstations, personal digital assistants (PDAs), and cellular phones.

Reference to layers herein, such as L2 and L3, refer to the appropriate layer in the Open Systems Interconnection (OSI) model. In particular, L2 refers to the data link layer within the OSI model. The data link layer may provide the functional and procedural methods to transfer data between the network devices and to detect and possibly correct errors that may occur in the physical layer. An example of a L2 communication medium is an Ethernet network. L3 refers to the network layer within the OSI model. The network layer may provide the functional and procedural methods for transferring variable length data sequences from a source to a destination via one or more networks while maintaining the quality of service requested by higher layers. An example of a layer 3 protocol is the Internet Protocol (IP). More information concerning the OSI model can be found in a IEEE publication entitled "OSI Reference Model—the ISO Model of Architecture for Open Systems Interconnection," by Hubret Zimmermann, published in IEEE Transactions on Communications, vol. 28, no. 4, dated April 1980, which is hereby incorporated by reference as if fully set forth herein.

Each of routers 10 may be located in different geographic locations and may each form a portion of network 4. For example, routers 10B and 10C may each be located within a different data center. Routers 10 are connected to one another via network links 16A-16F (collectively, "network links 16"). Network links 16 may comprise physical connections between routers 10, such as copper wires, coaxial cables, fiber optic lines, or a wireless connection, or a virtual or logical connection defined by routers 10 and mapped to physical links.

Generally, routers 10 use IGP to announce topology information to each other and synchronize link-state databases maintained by each of the routers. Routers 10 typically exchange initial link state messages to establish an adjacency relationship. For example, routers 10 may exchange IS-IS HELLO protocol data units (PDUs) to establish adjacencies with other routers. In addition, or alternatively, routers 10 transmit IGP update messages, such as IS-IS link state messages, to synchronize link-state databases maintained by each of routers 10. Each link state message is typically refreshed periodically on the network and is acknowledged by the receiving routers. For example, routers 10 may utilize periodic IS-IS link state PDUs for synchronizing their link-state databases and utilize partial sequence number PDUs (PSNPs) and complete sequence number PDUs (CSNPs) to acknowledge receipt of the information.

The link state messages typically specify a metric, which is sometimes referred to as a "link metric" or a "routing metric." The metric specifies a type of weighting for a particular link or route associated with the link state message. The metric may be an integer value within a predefined range, such as between 0-255, inclusive, and may represent a combined weighting of multiple different considerations, such as a current state of a switch fabric of a router and an internal (i.e., internal to the chassis of the router) temperature of the router.

Routers 10 utilize the metrics to determine one or more paths through network 4. Networks, such as network 4, are typically designed with multiple alternate paths to each destination such that network traffic may be re-routed to the destination should a problem arise with one of the paths to the destination. Each path from one of routers 10 to a destination has a corresponding cost, which is determined based on the metrics for each link along the respective path. Router 10A may be configured to select a path through network 4 that has a lowest total cost where the total cost for each path is an addition of the respective metrics for each link along each path. For example, router 10A may determine a path through network 4 to router 10D using at least a subset of links 16. Links 16 may each have a metric with a value of one such that router 10A would select the path with the fewest number of links (i.e., the path traversing link 16A to router 10B across link 16D to router 10D) as the path with the fewest number of links results in the path with the lowest total cost. In another example, link 16D may have a metric with the value ten. In this example, router 10A may select the path that includes link 16B to router 10C, link 16E to router 10E, and link 16F to router 10D as the total cost of the path is 3 whereas the total cost for the path through router 16B and using link 16D is 11.

In accordance with techniques of this disclosure, a router (e.g., router 10A) is configured to adjust the value of a metric included in a link state message based on a determined probability of future network traffic being impacted by a possible fault of the router without requiring the router to determine a likelihood that the possible fault will occur. That is, rather than only changing metrics in response an occurrence of a fault in a router that causes a loss of one or more links or otherwise disrupts network traffic, techniques of this disclosure enable the router to determine, based on one or more operating characteristics of the router, that a possible fault may occur in the future and to periodically update the metrics based on a combination of one or more of a probability that the possible fault will impact network traffic, the severity of the traffic impact, the duration of the traffic impact, and the scope of the traffic impact. Thus, techniques of this disclosure may enable a router to increase costs associated with particular links without explicitly "costing out" the route. In other words, the router may continue to advertise the links associated with the possible fault and associated traffic impact, but may increase the metric for those links. In this way, the router may increase the metric of particular links associated with possible faults such that network traffic may continue to travel across the links and may trigger re-routes for certain routes without having to bring down the links. For example, if router 10B is experiencing a partial degradation of data path bandwidth on link 16A, but not on links 16C and 16D, router 10B may increase the metric of link 16A (e.g., from the value one to the value two) while maintaining the values of the metrics of links 16C and 16D. If the data path bandwidth degrades further, router 10B may continue to increase the metric of link 16A. The increased metric for link 16A is communicated to the other routers 10 in network 4 using IPG update messages, such as link state messages. In one example, prior to the increased metric, router 10A determines that the preferred path to router 10D is over links 16A and 16D and router 10B. However, as router 10B increases the metric of link 16A, router 10A may determine that the preferred path no longer includes link 16A. Instead, router 10A may determine that the preferred path to router 10D includes links 16B, 16C, and 16D and routers 10C and 10B.

Routers 10 may adjust the metrics of links 16 based on any possible fault or any combination of different possible faults. The faults may include, but are not limited to, hardware faults, software faults, and bandwidth degradation. For example, router 10C may determine that a power supply of router 10C failed, but that there is a backup power supply. That is, one or more operating characteristics of router 10C include an indication that one power supply of router 10C is not functioning properly. Router 10C determines this operating characteristic (i.e., operating with one failed power supply) is indicative of a possible fault (i.e., that there is an increased likelihood of router 10C suffering a complete power failure). As a result, router 10C may increase the values of the metrics for each of links 16B, 16C, and 16E by some amount (e.g., 1, 5, 10, 20, etc.). The amount by which router 10C increases the metric is based, at least in part, on one or more of the probability of the possible fault, the scope of the traffic loss associated with the possible fault, the severity of the traffic loss associated with the possible fault, and the duration of the traffic loss associate with the possible fault. In some examples, router 10C may determine that the operating characteristics of router 10C are indicative of multiple possible faults. In such examples, router 10C may calculate the amount by which to increase the metric for each possible fault and then combine (e.g., add, multiply, or otherwise combine) the amounts to generate a total amount by which to adjust the metric.

While described as increasing the metric based on possible faults, routers 10 may also be configured to decrease the metric as the probability of network traffic impact associated with the possible faults decreases (e.g., due to an improvement of at least one operating condition of the router). For example, if a power supply of router 10C fails, but is then replaced with a new power supply, router 10C may reduce the metric to reflect the decreased probability of network traffic impact caused by router 10C losing power. As another example, router 10C may decrease the metric in response to a reduced processor load on router 10C as the reduced load decreases the severity of the network traffic impact associated with an overloaded processor (e.g., fewer dropped packets, smaller packet processing delays, etc.).

In some examples, routers 10 may be configured to minimize the number of metric updates within a particular amount of time by imposing constraints on the rate at which dynamic metrics are updated and re-evaluated. That is, routers 10 may be configured to perform the metric updates in a manner that is not likely to result in potential routing instabilities. For example, traffic impact prediction module 45 may be configured to periodically evaluate (e.g., once per 15 seconds, once per minute, once per hour, etc.) the operating characteristics of a router 10 and, as part of this periodic evaluation, adjust the metrics for the impacted routes.

In this way, routers 10 may continue to advertise routes without costing out the routes (i.e., taking down a link or taking down the router, causing all network traffic to suddenly route around router 10C), while increasing the metrics proportionate to the perceived risk as determined by router 10C when applying the policy framework. Techniques of this disclosure may dynamically change metrics for existing routing protocols based on a policy framework that maps a fault and/or an anticipated event or action to a probability, duration, severity and scope of traffic impact. By dynamically changing the metric without "costing out" the route, techniques of this disclosure may cause other routers 10 to reroute traffic around router 10C before the router 10C experiences a fault that interferes with the propagation of the network traffic. That is, by using the predicted probability and predicted duration as criteria, router 10C may apply the policy framework such that router 10C may preemptively re-route network traffic before the fatal fault or alarm condition actually occurs. In this way, the techniques of this disclosure may enable router 10C to implement preemptive re-routing using fuzzy logic.

While not shown in FIG. 1, techniques of this disclosure may also be utilized in network systems in which a path computation element (PCE) calculates the paths and builds the network topology. In calculating the paths and building the network topology, the PCE receives routing updates from each of the routers in the network that are under the PCE's control. Typically, the PCE has no way to identify the recovery, state transitions, and fault events automatically initiated within each router. However, as the techniques of this disclosure utilize routing updates (e.g., link state messages with adjusted routing metrics) to cause the preemptive re-routing, the techniques of this disclosure may enable the PCE to re-route the network traffic prior to the occurrence of the topology-changing device fault. In some examples, the PCE may push the preemptive re-routing policies down to routers 10 (i.e., install the policies on router 10) such that the PCE acts as a single central controller for the administrator rather than requiring the administrator to configure each router 10 individually. Moreover, as the PCE receives fault information from routers 10, the PCE may be configured to identify frequent (i.e., recurring) faults and adjust path selections based on the frequency of the faults in addition to the increased metrics.

In this way, techniques of this disclosure may increase the reliability of a network service provided to customers. The techniques described in this disclosure may be utilized by an enterprise to reduce or minimize downtime associated with failed network devices by proactively responding to potentially unstable network device conditions prior to failure of the network device. For example, the network devices may apply policies that route packets through other network devices that are currently operating in a preferred state. The techniques may also permit an administrator to take preventative measures to correct the potentially problematic network device conditions before occurrence of a device fault. Moreover, by preemptively re-routing network traffic, the network device may be able to attempt automated local recovery actions without comprising the network availability and may be configured with lower thresholds for initiating these automatic recovery actions as there is less likely to be any end user visible impact of these recovery actions.

Figure 2:
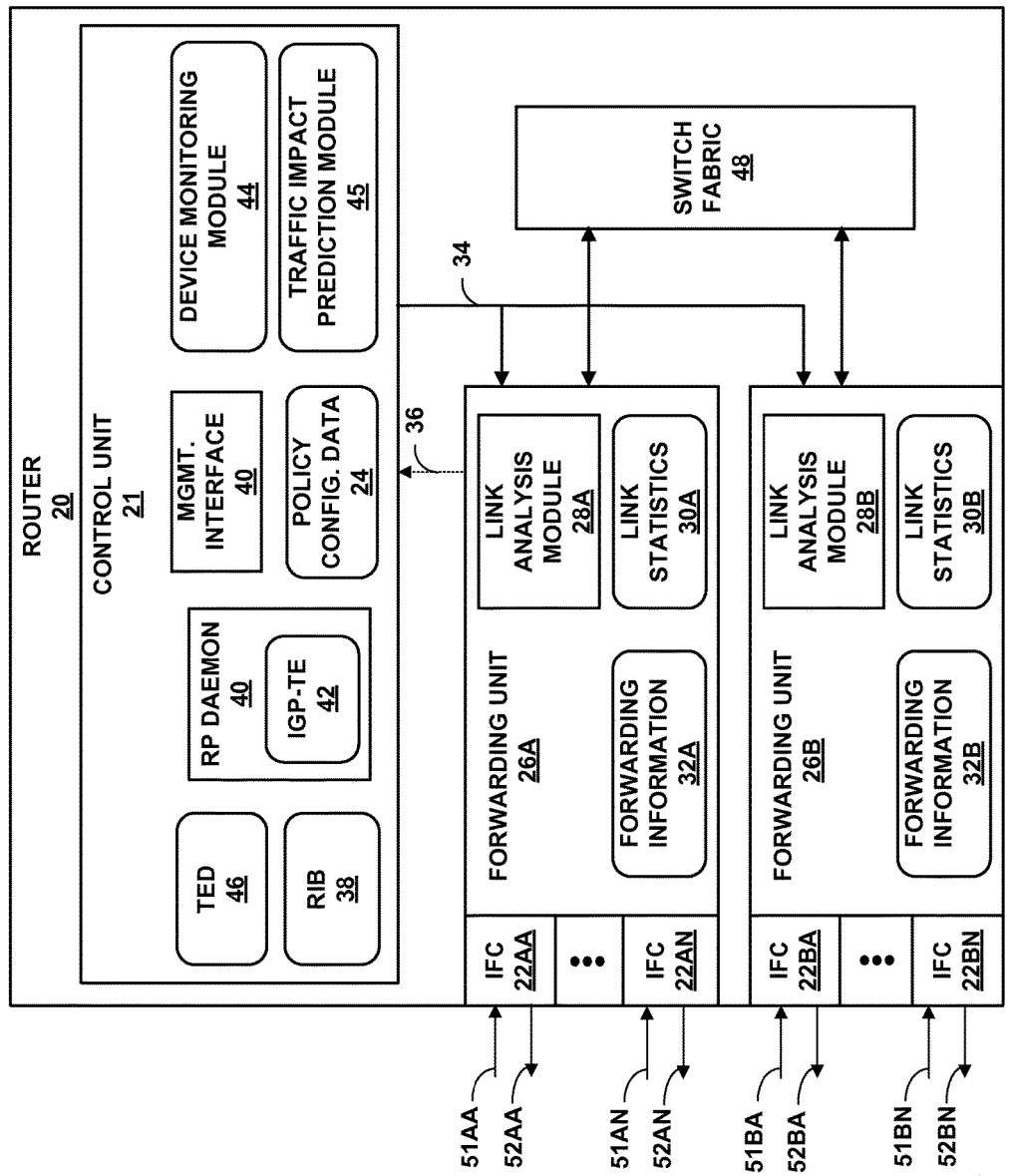
FIG. 2 is a block diagram illustrating example details of a router that proactively adjusts routing metrics, in accordance with techniques of this disclosure.

FIG. 2 is a block diagram illustrating an example router 20 that proactively adjusts routing metrics, in accordance with techniques of this disclosure. Router 20 may, for example, represent any of routers 10 of FIG. 1. In the example illustrated in FIG. 2, router 20 includes one or more interface cards (IFCs) 22AA-22BN (collectively, "IFCs 22") for sending and receiving packets using inbound physical links 51AA-51BN (collectively, "links 51") and outbound physical links 52AA-52BN (collectively, "links 52"). IFCs 22 are typically coupled to physical links 51, 52 via a number of physical interface ports. In general, router 20 receives inbound packets from inbound physical links 51, determines destinations for the received packets, and outputs the packets on outbound physical links 52 based on the destinations. In this way, physical links 51, 52 provide L2 communications media for transmitting packets. Any of physical links 51, 52 may be multi-access media, such as an Ethernet network, point-to-point media such as optical connections, or any of the example communication links described above with respect to FIG. 1.

Router 20 includes a control unit 21 and forwarding units 26A-26B (collectively, "forwarding units 26") coupled to control unit 21 with internal communication link 34. Control unit 21 may include one or more processors that execute software instructions, such as those used to define a software or computer program, stored to a computer-readable storage medium, such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 21 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Further, while described with respect to a particular network device, e.g., a router, the techniques of this disclosure are applicable to other types of network devices such as switches, content servers, bridges, multi-chassis routers, or other devices.

Control unit 21 executes the control and routing functionality of router 20. In this respect, control unit 21 represents hardware or a combination of hardware and software of that implements routing protocols by which routing information stored in routing information base 38 ("RIB 38") and traffic engineering stored in traffic engineering database 46 ("TED 46") may be determined. In some instances, TED 46 is implemented as an extended form of RIB 38 and thus subsumes RIB 38. RIB 38 may include information defining a topology of a network, such as network 4 of FIG. 1, learned by execution of Interior Gateway Protocol with Traffic Engineering extensions 42 ("IGP-TE 42") by routing protocol daemon 40 ("illustrated as RP daemon 40"). For example, RIB 38 may include a link-state database of physical and logical links (e.g., LSPs advertised as forwarding adjacencies). RIB 38 also includes a forwarding database that stores routes calculated by RP daemon 40 for various destinations. IGP-TE 42 may represent an embodiment of any interior routing protocol that announces and receives traffic engineering information for network links. For example, IGP-TE 42 may represent OSPF-TE or IS-IS- TE. In some instances, IGP-TE 42 may represent an IGP that does not provide traffic engineering extensions. RIB 38 may also include an MPLS routing table that stores MPLS path and label information for LSPs through the network. In such instances, IGP-TE 42 (executed by routing protocol daemon 40) advertises LSPs and associated metrics as forwarding adjacencies to other instances of IGP-TE executing on additional routers of the network.

Routing protocol daemon 40 is a process executed by control unit 21 to perform routing functionality. Routing protocol daemon 40 may resolve the topology defined by routing information in RIB 38 to select or determine one or more active routes through the network to various destinations. Control unit 21 may then update forwarding units 26 with these routes, where forwarding units 26 maintain these routes as respective forwarding information 32A, 32B that map network destinations to one or more of outbound interfaces 52.

Forwarding units 26 receive and forward control and data packets via switch fabric 48 along internal forwarding paths. Router 20 may include more or fewer forwarding units 26 in various examples. Forwarding units 26 may each include one or more packet forwarding engines ("PFEs") coupled to respective sets of IFCs 22 and may each represent, for example, a dense port concentrator (DPC), modular port concentrator (MPC), flexible physical interface card (PIC) concentrator (FPC), or another line card, for example, that is insertable within a router 20 chassis or combination of chassis. Interface cards 22, for instance, may include multiple PICs that each includes one or more inbound/outbound interfaces for physical links 51, 52. Each of forwarding units 26 may include substantially similar components to perform substantially similar functionality, said components and functionality being described hereinafter primarily with respect to forwarding unit 26A. Physical inbound and outbound interfaces of IFCs 22 (e.g., ports) may be specified by identifying the port type, a slot in a router 20 chassis for the corresponding one of forwarding units 26, a PIC, and a port number. For example, "GigE-3/1/2" may internally identify port 2 of PIC 1 on the one forwarding units 20 that occupies slot 3 in the router 20 chassis, and the port is a Gigabit Ethernet port.

Forwarding unit 26A may incorporate dense wavelength division multiplexing (DWDM) termination or other optical transport network (OTN) functionality into IFCs 22 to provide IP over DWDM capability. Forwarding unit 26A may include integrated transponders.

Forwarding units 26 forward network traffic received by IFC 22 via inbound links 51 over outbound links 52 of IFCs 22 in accordance with respective forwarding information 32A, 32B. When forwarding a transient packet, forwarding unit 26A traverses forwarding information 32A based on keying information within a header of the packet to ultimately select a next hop and output interface to which to forward the packet. Based on the selection, forwarding unit 26A may output the packet directly to an output interface of one of IFCs 22 of forwarding 26A or may forward the packet to switch fabric 48 for switching to the proper output interface coupled to forwarding unit 26B. The techniques of this disclosure are not limited to this architecture. In other embodiments, router 20 may be configured in a variety of ways. In some embodiments, for example, all or portions of control unit 21 and/or forwarding units 26 may be replicated and incorporated directly within IFCs 22. In some embodiments, all or portions of forwarding units 26 may be incorporated directly within control unit 21.

Link analysis modules 28A, 28B of respective forwarding units 26 determine and store link performance statistics for respective outbound physical links 51, 52 in respective link statistics 30A, 30B. Link analysis module 28A, for example, may determine the bit error rate (BER) and/or forward error correction (FEC) counts or other optical performance characteristics for outbound physical link 52A. Link analysis module 28A may determine optical performance characteristics using the G.709 framing structure (or "digital wrapper") to exchange management information within a wavelength of signal transmitted by outbound physical link 52A. As other examples, link analysis module 28A may determine delay, jitter, and/or PDU loss rates for outbound physical link 52A using Operation, Analysis, and Maintenance (OAM) techniques. One such OAM tool, referred to as OAM Frame Loss Measurement, standardizes mechanisms for loss measurement in an Ethernet computer network and is described in the Internal Telecommunication Union Telecommunication Standardization Section (ITU-T) recommendation Y.1731, "OAM functions and mechanisms for Ethernet based networks," May, 2006, which is incorporated by reference herein in its entirety. OAM Frame Loss Measurement as described in ITU-T Y.1731, Section 8, defines the Frame Loss Ratio performance metric to apply to Ethernet frames admitted at the ingress L2 flow point of an L2 connection and delivered to the egress L2 flow point of the L2 connection.

Forwarding unit 26A stores link statistics 30A for physical links 51, 52 in a computer-readable storage medium. Forwarding unit 26A offloads link statistics 30A, including link performance statistics for outbound link 52A, to control unit 21 in link statistics upload message 36.

Device monitoring module 44 may receive the link statistics upload message 36 and analyze at least a portion of the link statistics included in link statistics upload message 36. Device monitoring module 44 may also analyze link statistic information received from link statistics 30B. In general, device monitor module 44 monitors various operating characteristics of router 20, including link statistics, processor load, temperature (e.g., of the various components of router 20, the ambient air temperature within a chassis of router 20, etc.), router power status, the state of switch fabric 48, pending automatic recovery operations, the state of any hardware elements of router 20 including IFCs 22 and forwarding units 26, etc. Device monitoring module 44 may provide the information about the various characteristics of router 20 to traffic impact prediction module 45. Such information about the various characteristics of router 20 may be referred to herein as "state information" of the router.

Traffic impact prediction module 45 applies a policy framework to the one or more operating characteristics of router 20 to determine whether any of the one or more operating characteristics are indicative of a possible fault and determine whether and how to adjust the routing metrics based on the traffic impact of the possible fault. Network operators or other entities, such as network management systems, invoke management interface 40 (illustrated as "mgmt. interface 40") of control unit 21 to modify policy configuration data 24 (illustrated as "policy config. data 24") to create and/or modify one or more policies for the policy framework. That is, router 20 uses the policies specified for the policy framework to evaluate the current reliability of router 20 and the pending actions (e.g., automatic healing or recovery) to calculate the metrics to be advertised by router 20 to other routers using IGP. Management interface 40 may include a Simple Network Management Protocol (SNMP)

interface, a Device Management Interface (DMI), a command-line interface (CLI), or graphical user interface (GUI), for example.

In some examples, router 20 may be configured with a default set of faults for which router 20 may apply preemptive re-routing, a respective scope of the traffic impact for each faults (e.g., is the traffic impact limited to router 20, to a link, to a link group, etc.), a respective expected duration of the traffic impact associated with each fault, a respective probability that the traffic will be impacted for each fault, and a respective severity of the traffic impact for each fault. The administrator may change any of the default configuration information, including the additional cost to be applied to the impacted routes (i.e., the delta increase for the corresponding metric) for each fault. That is, the administrator may configure the maximum amount that the metric is permitted to be increased (i.e., the maximum delta that can be applied to the metrics) when applying the preemptive re-routing policies.

In configuring the traffic impact probability, the administrator may define a minimum threshold at which the possible fault has a non-zero probability of impacting traffic, a maximum threshold at which the impact to traffic is a certainty, and any number of intermediate points between the minimum and maximum thresholds. The severity of the fault may be configured to be within a range of values, such as between 1 and 5, inclusive.

In defining the policies for the policy framework, an administrator may also define one or more of a respective amount a metric increases for each particular type of fault, probabilities that traffic will be impacted for each type of fault, severities of each type of fault, and durations of each type of fault. Traffic impact prediction module 45 calculates the metric update for a fault based on the probability, duration, and severity of the fault and the configured policies.

The administrator may also add a default "additional costing" for faults that are not part of a default set of faults configured on router 20. For example, the administrator may select an alarm or event string and, based on which element of router 20 causes the event or alarm to be generated, traffic impact prediction module 45 may apply the policies to map the event or alarm to a set of routes for which the metrics need to be updated and update the corresponding metrics accordingly. In this way, techniques of this disclosure may also be applied to unforeseen events.

The policy framework may include policies that control restoration of the metric once the one or more operating characteristics of the router are no longer indicative of a possible fault. For example, the policy framework may include a policy may require an administrator to manually clear a fault prior to updating the metrics. That is, the policy may specify that, once router 20 increases the metrics for a particular route, the metrics remain elevated, even after the operating conditions are no longer indicative of a possible fault, until an administrator manually resets the metrics. As another example, the policy framework may include a policy that specifies that the metrics are automatically restored to the pre-adjusted values once the operating characteristics are no longer indicative of a fault.

The policy framework may also include policies for controlling automated recovery behaviors of router 20. That is, router 20 may be configured with policies that specify what, if any, automatic recovery techniques router 20 should execute for each possible fault. The policies may specify the particular recovery actions router 20 must undertake and after what time delay. For example, if a packet forwarding engine of router 20, such as forwarding unit 26A, gets stuck in a state that prevents the packet forwarding engine from actually forwarding traffic, a policy may specify whether or not router 20 should result a flexible physical interface card concentrator reset and, if so, after what delay. Typically, the policy specifies a delay to ensure that there is sufficient time after sending the IGP update message having the adjusted metrics for the other routers in the network to move the routes off of router 20. However, there is no explicit response sent by the neighboring routers for the routing updates and, therefore, router 20 may be configured with a timeout before the new metric is assumed to have percolated through the network and the required local actions can be initiated.

In some examples, traffic impact prediction module 45 may determine that one or more operating characteristics of router 20 indicate more than one possible fault. In instances where there are multiple unrelated possible faults, traffic impact prediction module 45 calculates the metric updates independently for all the unrelated faults and applies the maximum delta value specified by the policies to cap the cumulative metric increase. A fault may be considered unrelated to another fault when each of the faults concern different elements, conditions, or other characteristics of router 20 such that each fault impacts different elements and/or different routes router 20. In instances where there are multiple related possible faults, traffic impact prediction module 45 calculates the metric updates independently for all the related faults, determines the maximum metric update value, and adjusts the metric by the determined maximum metric update value. Two or more faults may be considered related when each fault concerns the same element, condition, or other characteristic of router 20 such that each fault impacts the same set of routes or links and, in some instances, the impact of the faults may be duplicative (i.e., the severity, scope, or duration of the traffic impact associated with one fault may be subsumed by the traffic impact associated with a related fault).

In some examples, traffic impact prediction module 45 may be configured to minimize the number of metric updates within a particular amount of time by imposing constraints on the rate at which dynamic metrics are updated and re-evaluated. That is, traffic impact prediction module 45 may be configured to perform the metric updates in a manner that is not likely to result in potential routing instabilities. For example, traffic impact prediction module 45 may be configured to periodically evaluate (e.g., once per 15 seconds, once per minute, once per hour, etc.) the operating characteristics of router 20 and, as part of this periodic evaluation, adjust the metrics for the impacted routes.

In this way, router 20 may continue to advertise routes without costing out the routes (i.e., taking down a link or taking down the router, causing all network traffic to suddenly route around router 20), while increasing the metrics proportionate to the perceived risk as determined by traffic impact prediction module 45 when applying the policy framework. Techniques of this disclosure may dynamically change metrics for existing routing protocols based on a policy framework that maps a fault and/or an anticipated event or action to a probability, duration, severity and scope of traffic impact. By dynamically changing the metric without "costing out" the route, techniques of this disclosure may cause other routers to reroute traffic around router 20 before router 20 experiences a fault that interferes with the propagation of the network traffic. That is, by using the predicted probability and predicted duration as criteria, traffic impact prediction module 45 may apply the policy framework such that router 20 may preemptively re-route network traffic before the fatal fault or alarm condition actually occurs. In this way, the techniques of this disclosure may enable router 20 to implement preemptive re-routing using fuzzy logic.

In one example scenario, router 20 needs to attempt a recovery or self-healing procedure in order to return to a fully operational state. For example, router 20 may experience faults in one or more of forwarding units 26 or a connectively failure with switch fabric 48. Rather than rebooting the problematic forwarding unit 26 or retraining the link with switch fabric 48, traffic impact prediction module 45 is configured to apply the policy framework to the errors reported by the problematic forwarding unit 26 and the switch fabric link errors such that the metrics gradually increase (e.g., proportionally, linearly, exponentially, etc.) with the errors. For example, as the forwarding unit error count and/or rate increases, traffic impact prediction module 45 increases the probability of traffic impact associated with the fault until the probability reaches 100%, at which time the problematic forwarding unit may be restarted. By gradually increasing the metrics, other routers in the network will gradually reroute network traffic around router 20 as the cost of directing traffic through router 20 becomes higher than directing traffic through other routers in the network. Thus, by the time the probability reaches 100% and the forwarding unit is restarted, very little, if any, network traffic is being directed through the problematic forwarding unit. As such, rebooting the forwarding unit will likely cause little, if any, loss of network traffic.

In another example scenario, router 20 is experiencing partial degradation of the data path capacity and/or bandwidth for certain links or for the entire system. For example, switch fabric 48 may be partially degraded such that the capacity of switch fabric is insufficient to process the rate of network traffic being handled by router 20. Device monitoring module 44 may detect that switch fabric 48 is causing fabric link errors, destination timeout errors, etc. such that the capacity of the fabric drops below a threshold specified in a preemptive re-routing policy. Similar to the previous scenario, as the switch fabric continues to degrade, traffic impact prediction module 45 increases the metrics to cause other routers in the network to route around router 20.

In yet another example scenario, router 20 is experiencing faults or failures that may or may not be traffic impacting, but where pre-emptive re-routing may be attempted if so configured. For example, there may be a temporary control plane connectivity failure between routing protocol daemon 40 and forwarding unit 26A or between routing protocol daemon 40 and switch fabric 48, which may be congestion related. For example, control unit 21 may have CPU overload or CPU hogging by process executing on control unit 21. Such faults can result in forwarding unit 26A not having updated forwarding information in forwarding information 32A. As another example, there may be a hardware failure where routing protocol daemon 40 continues to execute, such as an input clock or clock module failure. Such a failure may eventually cause router 20 to flap the impacted links, but flapping the links may cause network traffic loss. As yet another example, traffic impact prediction module 45 may determine that the power for router 20 may exceed a configured threshold (e.g., due to an irregular power source, a failure of one power supply where there are redundant power supplies, etc.). Such failures may eventually result in either router 20 itself or one or more of forwarding units 26 being either powered off or malfunctioning. Similar to the previous scenario, traffic impact prediction module 45 applies the policies in the policy framework to the operating characteristics to determine fi the operating characteristics are indicative of a possible fault, determines one or more of the probability, duration, severity, and scope of the traffic impact associated with the possible fault, and increases the metrics accordingly, which may cause other routers in the network to route around router 20.

Traffic impact prediction module 45 may use the metric updates to trigger router-level re-routing or link-level re-routing, depending on the predicted scope of the traffic impact (i.e., all network traffic being processed by router 20 is likely to be impacted or the network traffic traveling through a particular link or links is likely to be impacted). Traffic impact prediction module 45 may determine that the scope of the traffic impact is a router-level when traffic impact prediction module 45 in unable to identify the specific links that may be impacted by the possible fault or when traffic impact prediction module 45 determines that the entire router 20 is impacted by the possible fault. In instances where traffic impact prediction module 45 determines that the possible fault may have a router-level traffic impact, traffic impact prediction module 45 may update the metrics for all links of router 20 by sending individual link state messages for each of the links of router 20. In some examples, traffic impact prediction module 45 may be configured with an enhancement to IGP such that the link state message include a "node-level" update such that the other routers in the network can identify all routes advertised from a given router and router 20 can send a single metric to the given router that is to be applied to all routes advertised by the given router rather than send the individual update messages.

Traffic impact prediction module 45 may predict that the fault has a link-level traffic impact when traffic impact prediction module 45 is able to identify one or more particular links likely impacted by the fault (i.e., a subset of links identified as being prone to the possible fault). The subset of links that may be impacted may be limited to a single interface or port or may include links for multiple forwarding units 26. For possible faults associated with a link-level traffic impact, traffic impact prediction module 45 adjusts the metrics for the particular links likely to be impacted by the possible fault.

Figure 3:
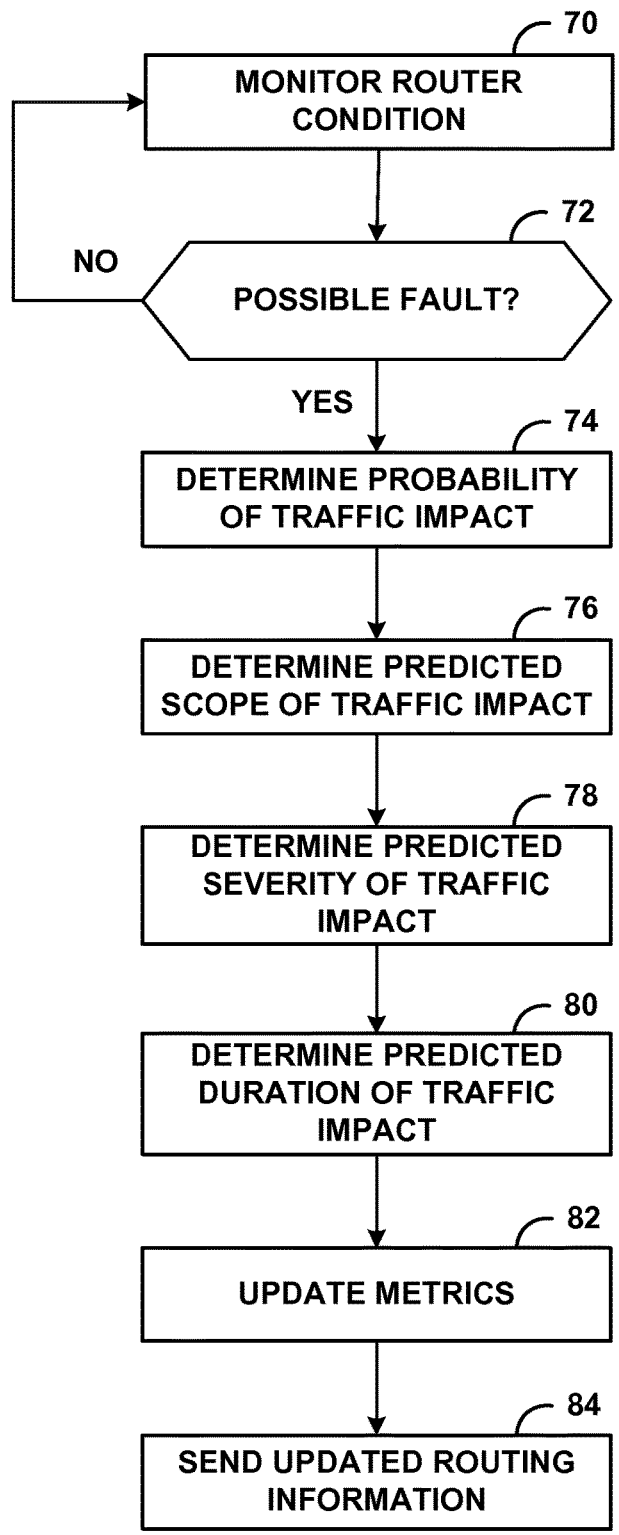
FIG. 3 is a flow chart illustrating an example operation of a router that proactively adjusts routing metrics, in accordance with techniques of this disclosure.

FIG. 3 is a flow chart illustrating an example operation of a router that proactively adjusts routing metrics, in accordance with techniques of this disclosure. The example operation of FIG. 3 is described with respect to example network 4 of FIG. 1 and router 20 of FIG. 2.

Device monitoring module 44 monitors router 20 and collects operating condition information for router 20, such as errors generated by one or more elements of router 20, processor load, bandwidth utilization, switch fabric state, temperatures of one or more elements of router 20, automated recovery actions, etc. and provides the information about the operating conditions to traffic impact prediction module 45. Traffic impact prediction module 45 analyzes the operating conditions of router 20 (70) and determines whether the operating conditions indicate a possible fault (72). Traffic impact prediction module 45 applies one or more policies of a preemptive re-routing policy framework to the operating conditions in order to determine whether the operating conditions are indicative of a possible fault. For example, traffic impact prediction module 45 may apply a chassis temperature policy to the current internal temperature of router 20. In this example, the policy may indicate that any temperature below 90 degree Fahrenheit is not indicative of a possible fault, that a temperature between 90 and 120 degrees Fahrenheit is indicative of the possible fault and that there is a certain probability, severity, scope, and/or duration of traffic impact associated with the possible fault, and a temperature greater than 120 degrees is indicative the possible fault and that there is an increase probability, severity, scope and/or duration of the traffic impact associated with the possible fault. If the state information indicates that the internal temperature of router 20 is 105 degrees Fahrenheit, which is between 90 and 120 degrees Fahrenheit, by applying the temperature policy, traffic impact prediction module 45 determines that the operating condition (i.e., the internal temperature) is indicative of a possible fault ("YES" branch of 72). If the temperature specified in the state information was 80 degrees Fahrenheit, traffic impact prediction module 45 determines that operating condition is not indicative of a possible fault ("NO" branch of 72) and device monitoring module 44 continues monitoring the operating condition of router 20 (70).

In instances where traffic impact prediction module 45 determines that one or more operating characteristics of router 20 are indicative of a possible fault ("YES" branch of 72), traffic impact prediction module 45 determines a probability that the possible fault is going to impact network traffic (e.g., by causing traffic loss, delay, route instability, etc.) (74). In determining whether the operating characteristics are indicative of a possible fault, traffic impact prediction module 45 may apply one or more policies of a preemptive re-routing policy framework to the operating characteristics. The policies may include one or more policies identifying one or more of: a set of possible faults, a respective network traffic impact scope of each possible fault of the set of possible faults, a respective probability of traffic loss for each possible fault of the set of possible faults, a respective severity of traffic loss for each possible fault of the set of possible faults, a respective duration of traffic loss for each possible fault of the set of possible faults, a respective amount by which a respective metric is configured to be adjusted for each possible fault of the set of possible faults, or a maximum amount by which the adjusted routing metric can be increased.

Traffic impact prediction module 45 determines the scope of the fault (76) by at least identifying whether the fault is a router-level fault, a link-level fault, or link group level fault. The preemptive re-routing policies may specify the scope of the fault such that traffic impact prediction module 45 applies one or more of the preemptive re-routing policies to the fault in order to determine the scope of the fault. For link-level or link group level faults, traffic impact prediction module 45 identifies the one or more links that would be impacted by the fault, should the fault occur.

Traffic impact prediction module 45 may also determine severity of the traffic impact associated with the possible fault by, for example, determining how much impact the possible fault would have on network traffic that travels along the identified impacted links (78). That is, traffic impact prediction module 45 may determine, based on the preemptive re-routing policies, an amount of one or more of traffic loss or traffic delay associated with the possible fault. For example, if the possible fault may cause occasional packet loss or a slight delay in the delivery of the packets (e.g., due to a long packet queue), traffic impact prediction module 45 may determine that the predicted severity of the traffic impact associated with the possible fault is low. However, if the possible fault may cause total packet loss for all network traffic for the impacted links, traffic impact prediction module 45 may determine that the predicted severity of the traffic impact associated with the possible fault is high. In various instances, the predicted severity of the traffic impact associated with the possible fault may be specified in the preemptive re-routing policies such that traffic impact prediction module 45 may determine the predicted severity of the traffic impact associated with the possible fault by applying one or more of the preemptive re-routing policies to the fault.

Traffic impact prediction module 45 determines the predicted duration of the traffic impact associated with the possible fault (80) by at least determining how long it may take router 20 to recover from the possible fault, should the possible fault actually occur. For example, traffic impact prediction module 45 may determine that the possible fault is switch fabric connectivity failure. In order to restore the connectivity with the switch fabric, traffic impact prediction module 45 determines that router 20 needs to retrain the switch fabric link and such a process requires a particular duration of time. The predicted duration of the fault may be specified in the preemptive re-routing policies such that traffic impact prediction module 45 may determine the predicted duration of the traffic impact associated with the possible fault by applying one or more of the preemptive re-routing policies to the operating conditions that are indicative of the possible fault.

Using the predicted probability, scope, severity, and duration of the traffic impact associated with the possible fault, traffic impact prediction module 45 determines updated metrics (82). The updated metrics specify an increased cost for the impacted routes and/or links of router 20 such that the cost of a path that includes the impacted links is greater than the cost of the same path if operating characteristics of router 20 were not indicative of a possible fault. In some examples, traffic impact prediction module 45 may determine the operating characteristics of router 20 are indicative of two or more possible faults. In such examples, traffic impact prediction module 45 determines if the two or more possible faults are related and adjusts the metrics accordingly. For example, if three possible faults are related, traffic impact prediction module 45 determines the possible fault having the largest cost increase and adjusts the metric by that amount. If none of the three possible faults are related, traffic impact prediction module 45 determines the cost increase associate with each possible fault and adjusts the metric by the sum of all three costs increases. If two of the possible faults are related, but the possible third fault is not related, traffic impact prediction module 45 determines the larger cost increase of the two related faults and adjusts the metric by the sum of the larger cost increase and the cost increase of the third fault. The cost increase of the possible faults may be specified in the preemptive re-routing policies such that traffic impact prediction module 45 may determine the cost increase amount of each fault by applying one or more of the preemptive re-routing policies to each possible fault.

Router 20 advertises the updated metrics using an IGP update message, such as an IS-IS link state message (84). Other routers in the network receive the link state message and update routes using the updated metric information. In some examples, as the cost associated with a link of router 20 is greater because of the fault, one of the other routers may determine that a new path that does not include router 20 is a lower cost path and may re-route network traffic to the new path. In this way, techniques of this disclosure may utilize existing routing protocols to preemptively re-route network traffic based on a fault rather than brining down the link or the router, which may cause packet loss.

The techniques described herein may be implemented in hardware, software, firmware, or any combination thereof.

Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method comprising:
   prior to occurrence of a possible device fault:
   determining, by a router, that one or more operating characteristics of the router are indicative of the possible device fault, wherein the router is one of a plurality of routers in a network, and wherein the possible device fault is one or more of a failure of a hardware component of the router or a failure of a software component of the router;
   responsive to determining that the one or more operating characteristics of the router are indicative of the possible device fault:
   determining, by the router, a probability of traffic loss associated with the possible device fault;
   determining, by the router and based at least in part on the probability of the traffic loss associated with the possible device fault, a nonzero amount by which to increase a routing metric for routes impacted by the possible device fault, wherein the amount by which to increase the routing metric is less for a lower probability of traffic loss associated with the possible device fault than for a higher probability of traffic loss associated with the possible device fault; and
   adjusting, by the router and based on the determined amount, the routing metric; and
   sending, by the router and to at least one other router of the plurality of routers in the network, one or more interior gateway protocol update messages specifying the adjusted routing metric.

2. The method of claim 1, further comprising:
   storing, by the router, a set of preemptive re-routing policies that specify at least a respective amount to increase a metric for each particular type of device fault and a respective probability of traffic loss associated with each particular type of device fault,
   applying, by the router, the set of preemptive re-routing polices to the one or more operating characteristics of the router,
   wherein determining the probability of the traffic loss comprises mapping, by the router and using the set of preemptive re-routing policies, the possible device fault to the probability of the traffic loss, and
   wherein determining the amount by which to increase the routing metric further comprises applying, by the router, the set of preemptive re-routing policies to the probability of the traffic.

3. The method of claim 2, wherein the set of preemptive re-routing polices further includes one or more policies identifying one or more of: a set of device faults, a respective network traffic impact scope of each device fault of the set of device faults, a respective severity of traffic loss for each device fault of the set of device faults, a respective duration of traffic loss for each device fault of the set of device faults, or a maximum amount by which the adjusted routing metric can be increased.

4. The method of claim 1, further comprising:
   determining, by the router, a severity of the traffic loss associated with the possible device fault;
   determining, by the router, a duration of the traffic loss associated with the possible device fault; and
   determining, by the router, a scope of the traffic loss associated with the possible device fault.

5. The method of claim 4,
   wherein determining the severity of the traffic loss comprises determining, by the router, an amount of one or more of traffic loss or traffic delay associated with the possible device fault, and
   wherein determining the amount by which to adjust the routing metric comprises increasing the routing metric based at least in part on the severity of the traffic loss.

6. The method of claim 4,
   wherein determining the duration of the traffic loss comprises determining, by the router, an amount of time required to recover from the possible device fault, and
   wherein determining the amount by which to adjust the routing metric comprises increasing the routing metric based at least in part on the duration of the traffic loss.

7. The method of claim 4,
   wherein determining the scope of the traffic loss comprises identifying, by the router, one or more links of the router determined to be impacted by the possible device fault, and wherein the adjusted routing metric includes an increased cost for routes associated with the identified one or more links.

8. The method of claim 1, wherein the possible device fault is a first possible device fault, the method further comprising:
prior to occurrence of the device fault, determining, by the router, that the one or more operating characteristics of the router are indicative of a second possible device fault, wherein the first possible device fault is related to the second possible device fault,
wherein determining the amount by which to increase the routing metric comprises:
determining a first adjusted routing metric value for the first possible device fault;
determining a second adjusted routing metric value for the second possible device fault; and
setting the amount by which to increase the routing metric to a larger of the first adjusted routing metric value and the second adjusted routing metric value.

9. The method of claim 1, wherein the possible device fault is a first possible device fault, the method further comprising:
prior to occurrence of the first possible device fault, determining, by the router, that the one or more operating characteristics of the router are indicative of a second possible device fault, wherein the first possible device fault is not related to the second possible device fault,
wherein determining the amount by which to increase the routing metric comprises:
determining a first adjusted routing metric value for the first possible device fault;
determining a second adjusted routing metric value for the second possible device fault; and
determining the amount by which to increase the routing metric by at least adding the first adjusted routing metric value and the second adjusted routing metric value.

10. The method of claim 9, wherein determining the amount by which to increase the routing metric further comprises:
responsive to determining that the amount is greater than a maximum value for the routing metric, setting the amount by which to increase the routing metric to the maximum value.

11. The method of claim 1, wherein the one or more operating characteristics of the router include one or more of: a temperature of the router, a processor utilization of the router, respective link statistics for one or more links of the router, a power status of the router, a state of a switch fabric of the router, an indication of a pending automatic repair operation, a respective state of one or more network interfaces of the router, or a respective state of one or more forwarding units of the router.

12. A network device comprising:
a set of physical network interfaces for sending and receiving network packets; and
a control unit that executes a routing protocol and a traffic impact prediction module,
wherein the traffic impact prediction module:
determines, prior to occurrence of a possible device fault, that one or more operating characteristics of the network device are indicative of the possible device fault, wherein the network device is one of a plurality of network devices in a network, and wherein the possible device fault is one or more of a failure of a hardware component of the router or a failure of a software component of the router,
responsive to determining that the one or more operating characteristics of the router are indicative of the possible device fault:
determines a probability of traffic loss associated with the possible device fault;
determines, based at least in part on the probability of traffic loss associated with the possible device fault, a nonzero amount by which to increase a routing metric for routes impacted by the possible device fault, wherein the amount by which to increase the routing metric is less for a lower probability of traffic loss associated with the possible device fault than for a higher probability of traffic loss associated with the possible device fault; and
adjusts, based on the determined amount, the routing metric, and
wherein, prior to the occurrence of the possible device fault, the routing protocol sends, via at least one of the set of physical network interfaces, one or more interior gateway protocol update messages specifying the adjusted routing metric to at least one other network device in the network.

13. The network device of claim 12,
wherein the control unit executes a management interface,
wherein the management interface stores a set of preemptive re-routing policies that specify at least a respective amount to increase a metric for each particular type of device fault and a respective probability of traffic loss associated with each particular type of device fault, and
wherein the traffic impact prediction module determines that the one or more characteristics of the network device are indicative of the possible device fault by at least applying the set of preemptive re-routing polices to the one or more operating characteristics of the network device, determines the probability of the traffic loss by at least mapping, using the set of preemptive re-routing policies, the possible device fault to the probability of the traffic loss, and determines the amount by which to increase the routing metric by at least applying the set of preemptive re-routing policies to the determined probability of the traffic loss.

14. The network device of claim 13, wherein the set of preemptive re-routing polices includes one or more policies identifying one or more of: a set of device faults, a respective network traffic impact scope of each device fault of the set of device faults, or a maximum amount by which the adjusted routing metric can be increased.

15. The network device of claim 12, wherein the fault prediction module:
determines a severity of the traffic loss by at least determining an amount of one or more of traffic loss or traffic delay associated with the possible device fault,
determines a duration of the traffic loss by at least determining an amount of time required to recover from the possible device fault,
determines a scope of the traffic loss by at least one or more links of the router determined to be impacted by the possible device fault, and
determines the amount by which to adjust the routing metric by at least increasing the routing metric based at least in part on the severity of the traffic loss and the duration of the traffic loss, wherein the adjusted routing metric includes an increased cost for routes associated with the identified one or more links.

16. The network device of claim 12,
wherein the possible device fault is a first possible device fault, and
wherein the traffic impact prediction module predicts, prior to occurrence of the first possible device fault, that the one or more operating characteristics of the network device are indicative of a second possible device fault, wherein the first possible device fault is related to the second possible device fault, and determines the amount by which to adjust the routing metric by at least:
- determining a first adjusted routing metric value for the first possible device fault;
- determining a second adjusted routing metric value for the second possible device fault; and
- setting the amount by which to adjust the routing metric to a larger of the first adjusted routing metric value and the second adjusted routing metric value.

17. The network device of claim 12,
wherein the possible device fault is a first possible device fault, and
wherein the traffic impact prediction module predicts, prior to occurrence of the first possible device fault, that the one or more operating characteristics of the network device are indicative of a second possible device fault, wherein the first possible device fault is not related to the second possible device fault, and determines the amount by which to adjust the routing metric by at least:
- determining a first adjusted routing metric value for the first possible device fault;
- determining a second adjusted routing metric value for the second possible device fault; and
- determining the amount by which to adjust the routing metric by at least adding the first adjusted routing metric value and the second adjusted routing metric value.

18. The network device of claim 17, wherein the traffic impact prediction module determines the amount by which to increase the routing metric by at least, responsive to determining that the amount is greater than a maximum value for the routing metric, setting the amount by which to increase the routing metric to the maximum value.

19. A non-transitory computer-readable storage medium encoded with instructions that cause one or more processors of a router to:
- prior to occurrence of a possible device fault, determine that one or more operating characteristics of the router are indicative of the possible device fault, wherein the router is one of a plurality of routers in a network, and wherein the possible device fault is one or more of a failure of a hardware component of the router or a failure of a software component of the router;
- responsive to determining that the one or more operating characteristics of the router are indicative of the possible device fault:
  - determine a probability of traffic loss associated with the first possible device fault;
  - determine, based at least in part on the probability of the traffic loss associated with the possible device fault, a nonzero amount by which to increase a routing metric for routes impacted by the possible device fault, wherein the amount by which to increase the routing metric is less for a lower probability of traffic loss associated with the possible device fault than for a higher probability of traffic loss associated with the possible device fault; and
  - adjust, based on the determined amount, the routing metric; and
- send, to at least one other router of the plurality of routers in the, one or more interior gateway protocol update messages specifying the adjusted routing metric.

20. The method of claim 1, wherein the possible device fault is a first possible device fault, the method further comprising:
- responsive to determining, by the router, that the one or more operating characteristics of the router are indicative of a second possible device fault different from the first possible device fault, determining a probability of traffic loss associated with the second possible device fault,
- wherein determining the nonzero amount by which to increase the routing metric is based at least in part on the probability of the traffic loss associated with the first possible device fault and the probability of traffic loss associated with the second device fault.

* * * * *